(12) United States Patent
Hsieh

(10) Patent No.: US 6,908,268 B1
(45) Date of Patent: Jun. 21, 2005

(54) FASTENER FOR SECURING A CONTAINER ON A VEHICLE

(76) Inventor: David Hsieh, 3F, No. 2, Chin-Chung St., Taichung City (TW)

( * ) Notice: Subject to any disclaimer, the term of this patent is extended or adjusted under 35 U.S.C. 154(b) by 0 days.

(21) Appl. No.: 10/868,288

(22) Filed: Jun. 14, 2004

(51) Int. Cl.⁷ .............................................. B63B 25/24
(52) U.S. Cl. ........................... 410/85; 410/100; 410/81
(58) Field of Search .............................. 410/85, 96, 97, 410/77, 80, 81, 100; 114/75; 248/499

(56) References Cited

U.S. PATENT DOCUMENTS

| | | | | |
|---|---|---|---|---|
| 632,997 | A | * 9/1899 | Gilkey | 410/51 |
| 3,278,210 | A | * 10/1966 | Raymond | 403/46 |
| 3,416,763 | A | * 12/1968 | Moreno | 24/68 R |
| 3,719,377 | A | * 3/1973 | Schutz et al. | 403/44 |
| 5,143,010 | A | * 9/1992 | Behr et al. | 114/75 |
| 6,161,981 | A | * 12/2000 | Dehlin | 403/43 |
| 6,666,634 | B1 | 12/2003 | Hsieh | |

FOREIGN PATENT DOCUMENTS

EP 344635 * 12/1989 .................. 114/75

* cited by examiner

Primary Examiner—H. Gutman
(74) Attorney, Agent, or Firm—Christie, Parker and Hale, LLP

(57) ABSTRACT

A fastener includes first and second fastener components. The first fastener component includes two rails and a fixed body with two ends respectively connected to the rails, and a female screw hole between the two ends. A lock body is mounted on the rails for sliding along the rails so as to move away or toward the fixed body, and has two opposite ends abutting respectively against the rails, and a noncircular locking hole between the ends of the lock body. The second fastener component includes a stem formed with a male thread portion for engaging the female screw hole, and a locking portion for extending into and engaging the locking hole so as to prevent the stem from rotation. An engagement unit provides engagement between surfaces of the lock body and the locking portion so as to prevent the lock body from undesirably disengaging from the locking portion.

8 Claims, 8 Drawing Sheets

US 6,908,268 B1

FASTENER FOR SECURING A CONTAINER ON A VEHICLE

BACKGROUND OF THE INVENTION

1. Field of the Invention

The invention relates to a fastener for securing a container on a vehicle, more particularly to a fastener for securing a container firmly on the deck of a container ship.

2. Description of the Related Art

Referring to FIG. 1, to prevent undesired movement of stacks of containers 11 on a container ship, lashing rods 2 and fastening assemblies 3 are generally used to secure the containers 11 to deck fittings on a deck 12 of the ship. A conventional fastening assembly 3 includes a connecting member 31 and a connecting rod 32 that are connected in threaded engagement. However, when the ship pitches and rolls in a stormy sea, the threaded connection may be loosened to result in disengagement of the connecting member 31 from the connecting rod 32.

U.S. Pat. No. 6,666,634 proposes a "Positioning assembly for positioning a container on a platform," which was intended to overcome the aforesaid drawback of the conventional fastening assembly. The positioning assembly includes a limiting seat formed with a limiting hole, and a platform-connecting rod that engages threadedly a container-connecting unit and that has an engaging stud portion for engaging the limiting hole to arrest rotation of the platform-connecting rod, thereby preventing undesired disengagement of the platform-connecting rod from the container-connecting unit. However, the limiting seat may still disengage from the platform-connecting rod due to severe rocking of the ship.

SUMMARY OF THE INVENTION

Therefore, an object of the present invention is to provide a fastener adapted to position a container firmly on a deck of a ship.

Accordingly, a fastener of this invention includes a first fastener component, a lock body, a second fastener component, and an engagement unit. The first fastener component includes a pair of rails, and a fixed body which has two ends respectively connected to the rails, and a female screw hole between the two ends. The lock body is mounted on the rails for sliding along the rails so as to move away or toward the fixed body. The lock body has two opposite ends abutting respectively against the rails, and a noncircular locking hole between the ends of the lock body. The second fastener component includes a stem which is formed with a male thread portion for engaging the female screw hole, and a locking portion for extending into and engaging the locking hole so as to prevent the stem from rotation. The engagement unit provides engagement between surfaces of the lock body and the locking portion so as to prevent the lock body from undesirably disengaging from the locking portion.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
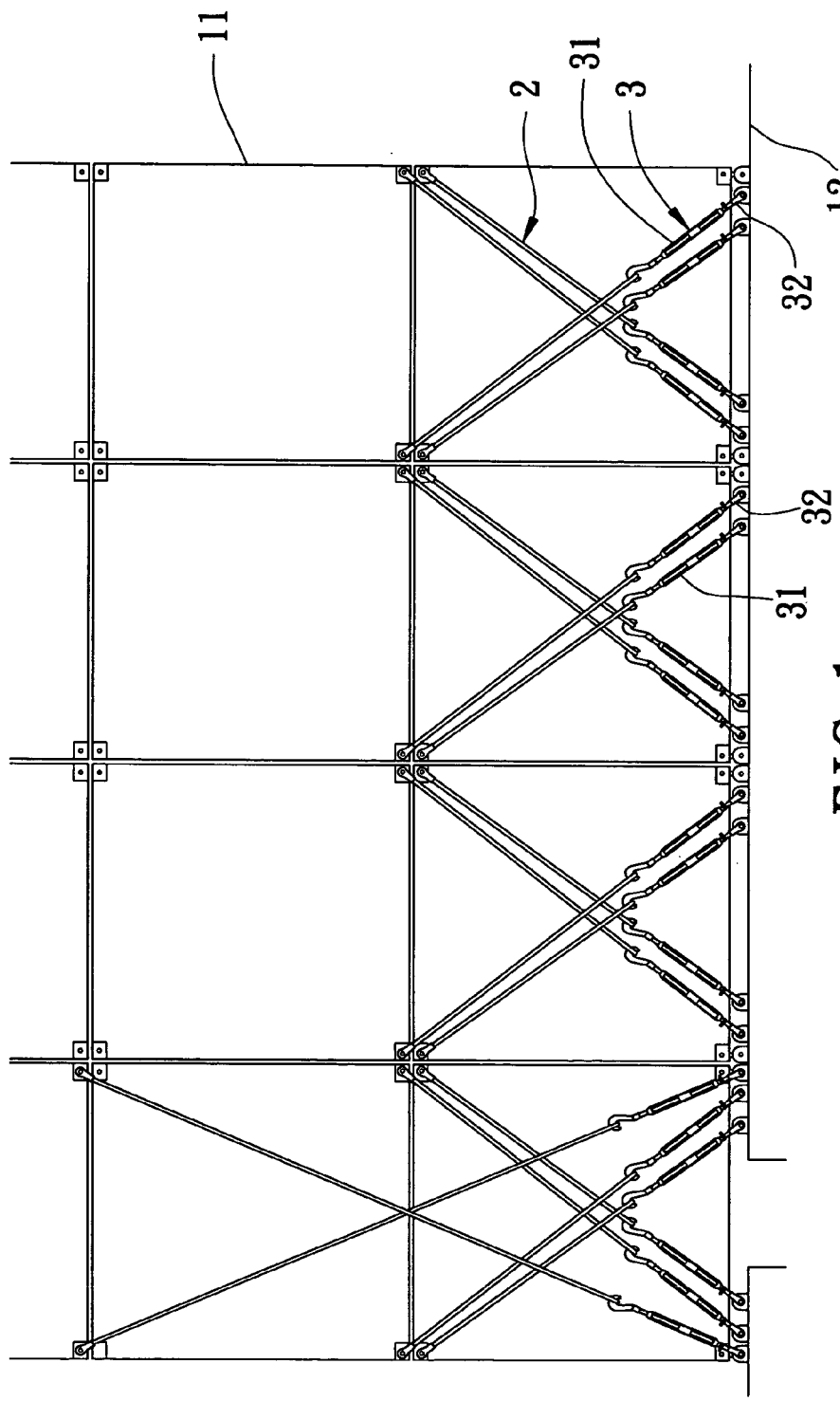
FIG. 1 is a schematic view showing conventional fastener assemblies for securing containers on the deck of a ship.

Before the present invention is described in greater detail, it should be noted that like elements are denoted by the same reference numerals throughout the disclosure.

Figure 2:
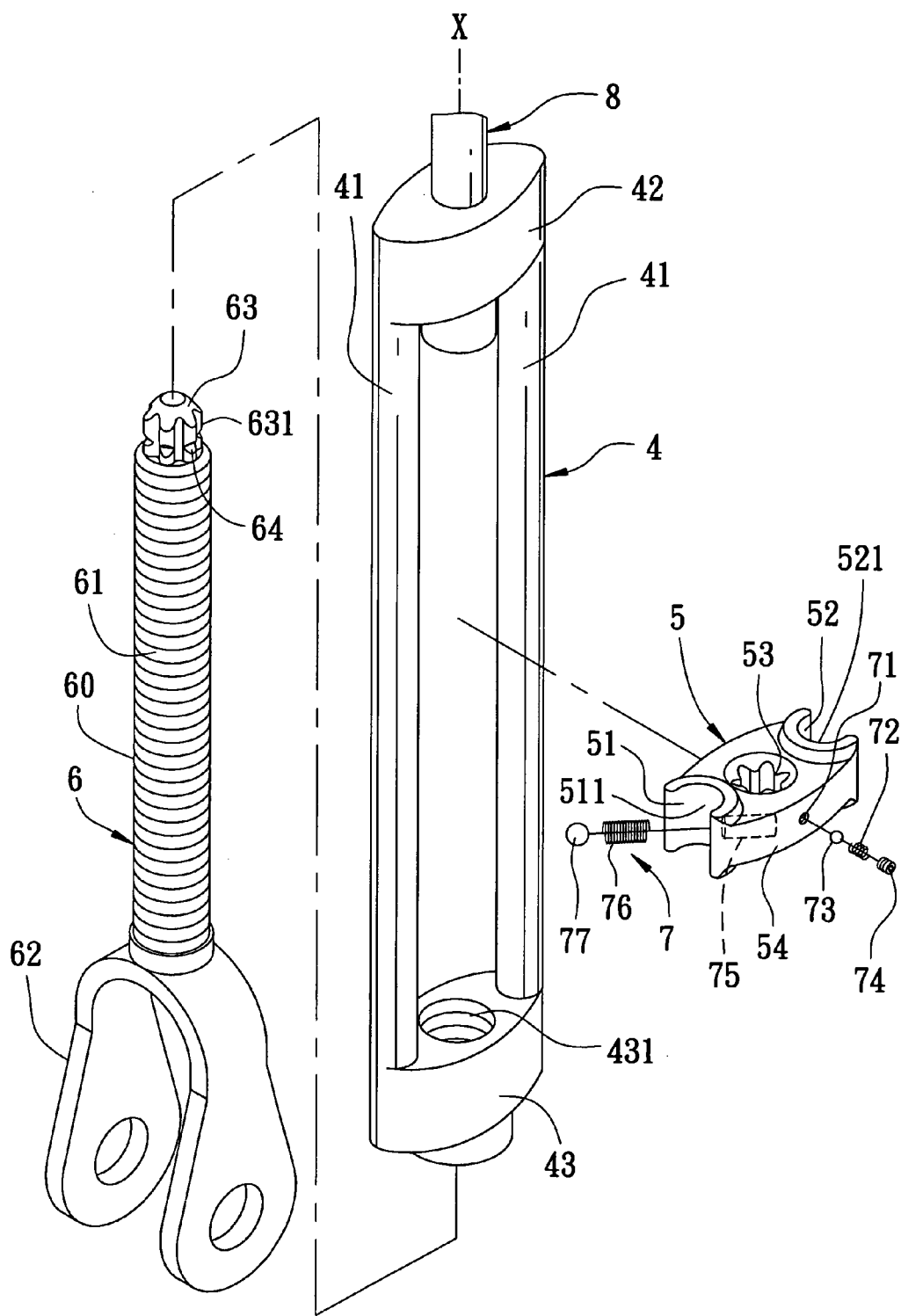
FIG. 2 is an exploded perspective view of the first preferred embodiment of a fastener according to this invention.

Referring to FIG. 2, the preferred embodiment of a fastener according to this invention is shown to include a first fastener component 4, a lock body 5, a second fastener component 6, and an engagement unit 7.

The first fastener component 4 includes a pair of rails 41 that are parallel to each other about an axis (X) and that are configured as rods in this embodiment, a connecting body 42 connected to upper ends of the rails 41, and a fixed body 43 which has two ends respectively connected to lower ends of the rails 41, and a female screw hole 431 between the two ends. The female screw hole 431 extends through the fixed body 43 along the axis (X).

The lock body 5 is mounted on the rails 41 for sliding along the rails 41 so as to move away or toward the fixed body 43. The lock body 5 has two opposite ends 51, 52 abutting respectively against the rails 41, and a noncircular locking hole 53 disposed between the ends 51, 52 of the lock body 5 and extending along the axis (X). In this embodiment, the locking hole 53 has a plurality of radially extending tooth-like hole parts, and the opposite ends 51, 52 are respectively formed with notches 511, 521 for receiving the rails or rods 41.

The second fastener component 6 includes a stem 60 which is formed with a male thread portion 61 for engaging the female screw hole 431, an inverted U-shaped connector 62 coupled to a lower end of the stem 60 and adapted to be connected to a deck fitting (not shown), and a noncircular locking portion 63 which is formed on an upper end of the stem 60, and which extends into and which engages the locking hole 53 so as to prevent the stem 60 from rotation. In this embodiment, the locking portion 63 is a toothed portion and has a plurality of radially projecting teeth 631, each of which is formed with a substantially V-shaped recess 64. The stem 60 is inserted into the female screw hole 431 along the axis (X) such that the male thread portion 61 engages the female screw hole 431 and such that the locking portion 63 is interposed between the rails 41.

The engagement unit 7 provides engagement between surfaces of the lock body 5 and the locking portion 63 so as to prevent undesired disengagement of the lock body 5 from the locking portion 63. The engagement unit 7 includes a bore 71 which is formed in the lock body 5, which extends from an outer peripheral surface 54 of the lock body 5, and which is communicated with the locking hole 53, a spring 72 received in the bore 71, a spring-biased first engaging element 73 received in the bore 71 and protruding into the locking hole 53 to engage the locking portion 63 of the stem 60, and a stop screw 74 engaging threadedly the bore 71 adjacent the outer peripheral surface 54 to abut against the spring 72. The engagement unit 7 further includes a passage 75 extending from the notch 511 in the end 51 of the lock body 5 toward the locking hole 53, a spring 76 received in the passage 75, and a spring-biased second engaging element 77 received in the passage 75 and protruding outward from the notch 511 in the end 51 of the lock body 5 to engage one of the rails or rods 41. In this embodiment, the springs 72, 76 are compression springs, whereas the spring-biased first and second engaging elements 73, 77 are balls.

Figure 3:
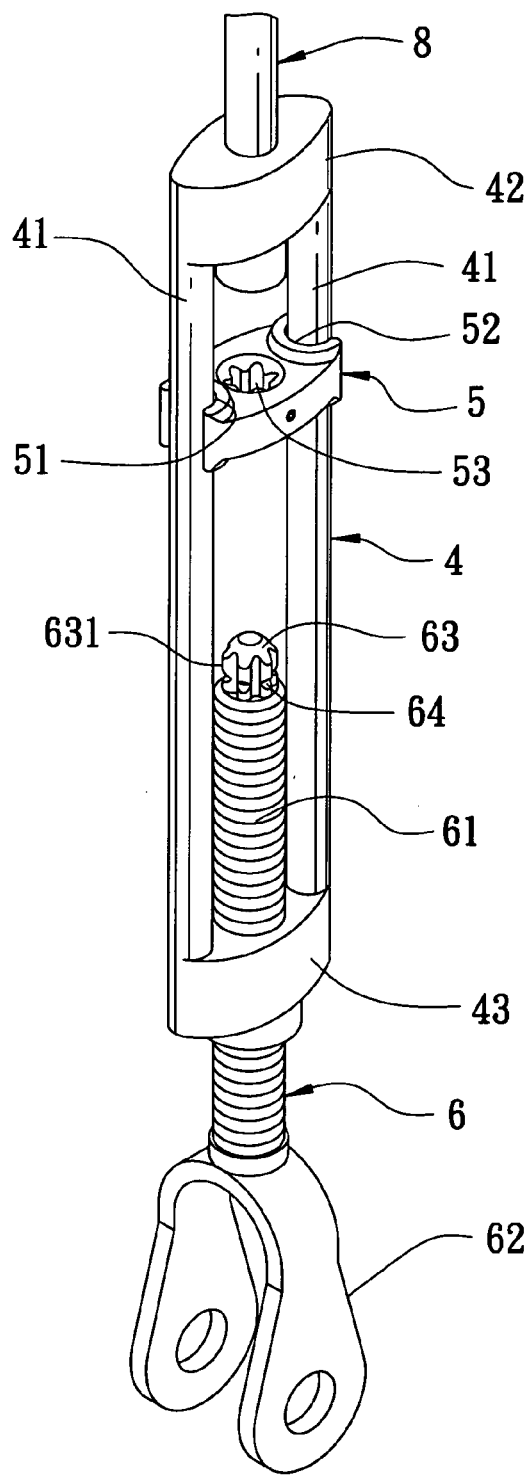
FIG. 3 is a perspective view of the first preferred embodiment in an assembled state.
Figure 4:
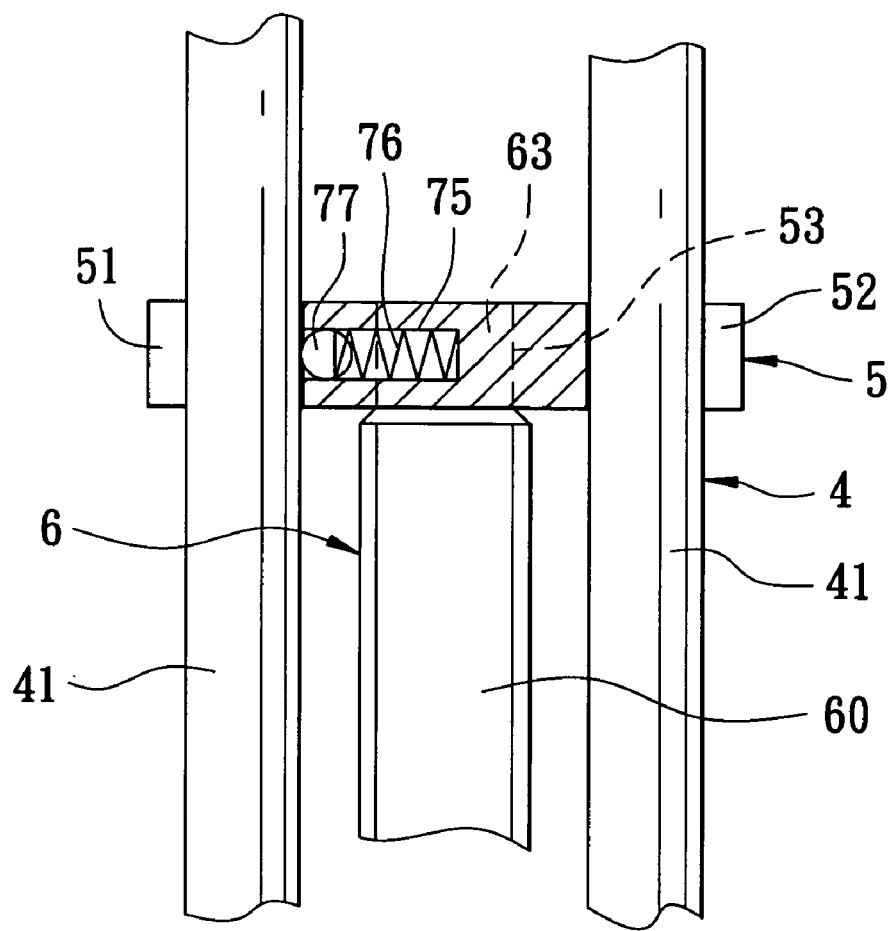
FIG. 4 is a fragmentary sectional view of the first preferred embodiment, illustrating how an engaging element in a lock body engages a rail of a first fastener component.

Referring to FIGS. 3 and 4, when this invention is used in conjunction with a lashing rod 8 to lash a container (not shown) to a deck fitting (not shown), the spring 76 will urge the second engaging element 77 against the corresponding rail 41 such that the lock body 5 can be positioned on the corresponding rail 41 without slipping downward if no external force is applied thereto. As such, the operator can conveniently rotate the first fastener component 4 with both hands to adjust the depth of threaded engagement between the first and second fastener components 4, 6, thereby facilitating the operation of lashing the container.

Figure 5:
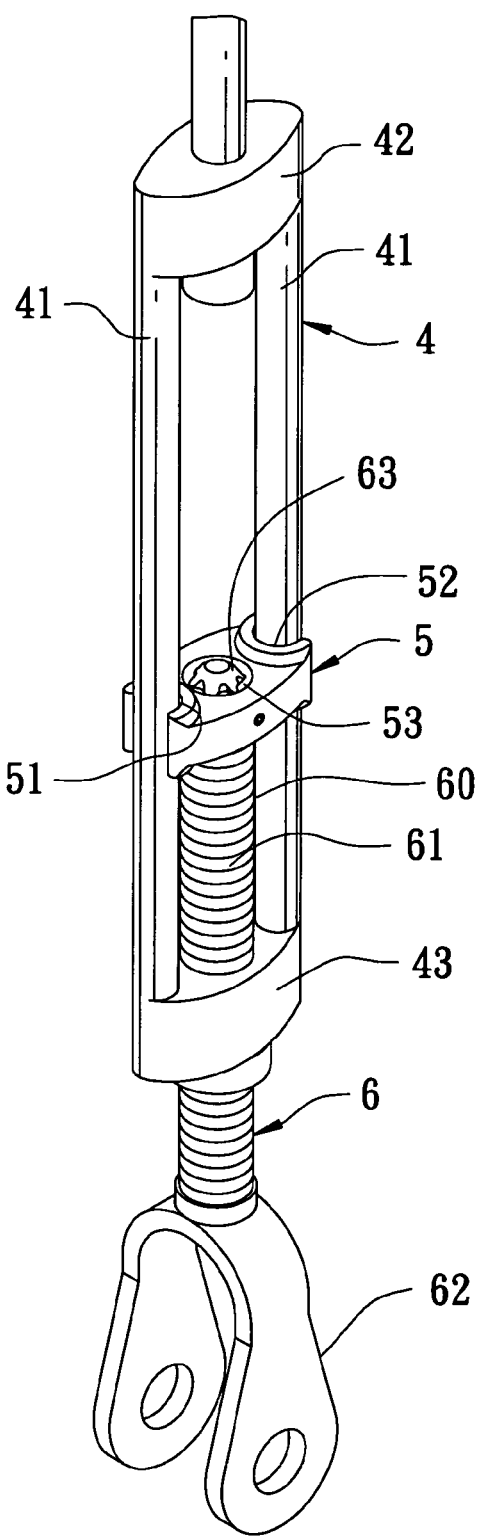
FIG. 5 is a perspective view of the first preferred embodiment in an assembled state, illustrating how a second fastener component engages the lock body.
Figure 6:
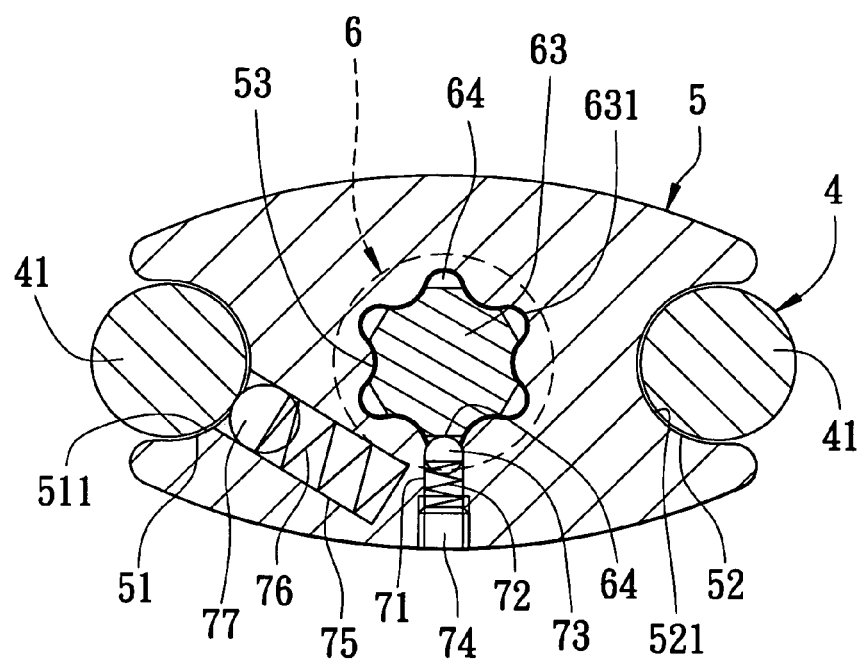
FIG. 6 is a sectional view of the first preferred embodiment, illustrating how an engaging element engages a recess in a locking portion.

Referring to FIGS. 5 and 6, after completion of the lashing operation, the lock body 5 can be pushed slightly such that the lock body 5 slides downwardly along the rails 41 until the locking hole 53 engages the locking portion 63, thereby preventing rotation of the second fastener component 6 relative to the lock body 5. At the same time, the first engaging element 73 in the bore 71 will engage a corresponding one of the recesses 64 in the teeth 631 of the locking portion 63 to retain the lock body 5 in position. As the recess 64 limits the first engaging element 73 from axial movement relative to the locking portion 63, the stop screw 74 effectively positions the lock body 5 and prevents slippage of the lock body 5 from the locking portion 63.

When it is desired to release the lock body 5 and the second fastener component 6, it is only necessary to apply an upward force to the lock body 5 such that the first engaging element 73 is caused to disengage from the corresponding recess 64 against the biasing force of the spring 72 and to retract into the bore 71.

It is noted that the teeth 631 of the locking portion 63 and the tooth-like hole parts of the locking hole 53 have a relatively large depth such that relative rotation between the lock body 5 and the second fastener component 6 can still be positively checked even when the locking portion 63 is slightly worn. Furthermore, as the lock body 5 is mounted on the rails 41 of the first fastener component 4 through the notches 511, 521 that receive the rails 41, the lock body 5 can be conveniently mounted on the rails 41 by force fitting the lock body 5 between the rails 41 through lateral pressurizing forces.

Figure 7:
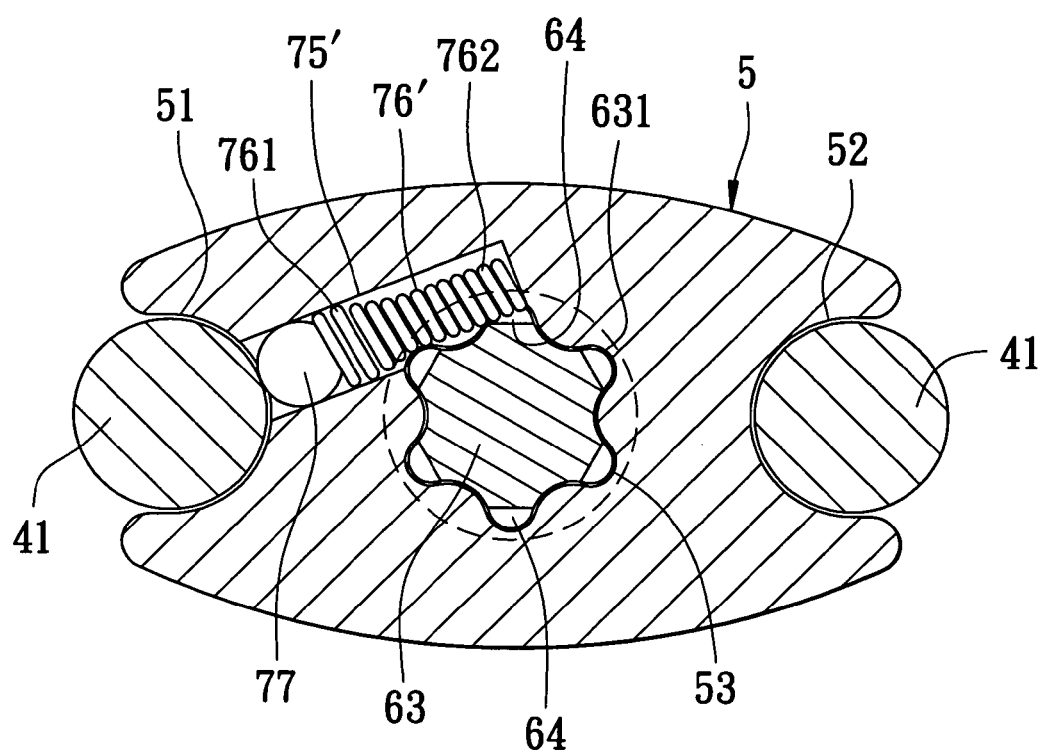
FIG. 7 is a sectional view of the second preferred embodiment of a fastener according to this invention.
Figure 8:
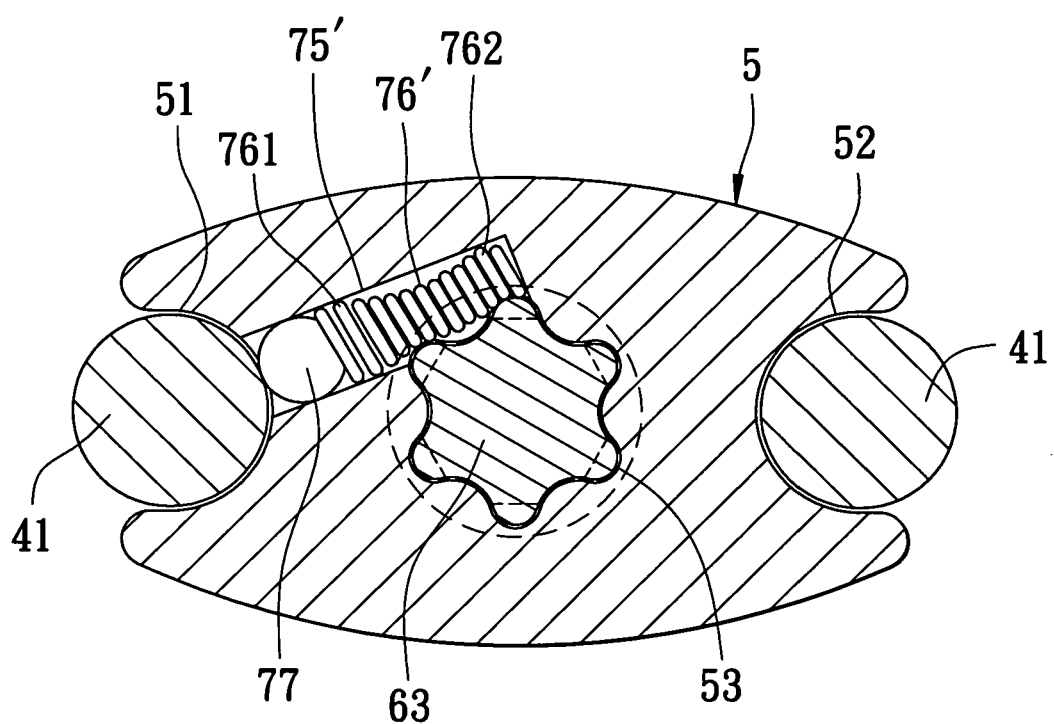
FIG. 8 is a view similar to FIG. 7, illustrating how a coiled spring disengages from a recess in a locking portion.

Referring to FIGS. 7 and 8, the second preferred embodiment of a fastener according to this invention is shown to be substantially similar to the previous embodiment. In this embodiment, the passage 75' extends from the locking hole 53 to the notch 511 in the end 51, and the spring 76' is a coiled spring that is received in the passage 75'. The engagement element 77 is received in the passage 75' and is biased by the coiled spring 76' to protrude into the notch 511 to engage a corresponding one of the rails 41. The coiled spring 76' includes a large-diameter portion 761 and a small-diameter portion 762. The large-diameter portion 761 is dimensioned such that it substantially contacts an inner surface of the passage 75'. The small-diameter portion 762 extends partly into the locking hole 53 such that when the locking portion 63 engages the locking hole 53, the small-diameter portion 762 is engageable with a corresponding one of the recesses 64 in the projecting teeth 631 of the locking portion 63 to retain the locking portion 63 in position, and such that when an external force is applied to cause the lock body 5 to disengage from the locking portion 63, the small-diameter portion 762 is pushed radially within the passage 75' to disengage from the corresponding recess 64.

Due to the configuration of the fastener according to this invention, the engagement between the lock body 5 and the second fastener component 6 can be enhanced considerably to help minimize the adverse effect of wearing thereon. In addition, the provision of the engagement unit 7 permits the lock body 5 to be slidable along and positioned on the rails 41 selectively in a convenient manner, as well as preventing undesired disengagement of the lock body 5 from the first and second fastener components 4, 6.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A fastener comprising:
   a first fastener component including a pair of rails, and a fixed body which has two ends respectively connected to said rails and a female screw hole between said two ends;
   a lock body mounted on said rails for sliding along said rails so as to move away or toward said fixed body, said lock body having two opposite ends abutting respectively against said rails, and a noncircular locking hole between said ends of said lock body;
   a second fastener component including a stem which is formed with a male thread portion for engaging said female screw hole and a locking portion for extending into and engaging said locking hole so as to prevent said stem from rotation; and
   an engagement unit for providing engagement between surfaces of said lock body and said locking portion so as to prevent said lock body from undesirably disengaging from said locking portion.

2. The fastener as claimed in claim 1, wherein said locking portion is a toothed portion formed on said stem, and has a plurality of radially projecting teeth, each of said teeth having a recess for engaging said engagement unit, said locking hole having a plurality of radially extending tooth-like hole parts.

3. The fastener as claimed in claim 1, wherein said engagement unit includes a bore formed in said lock body and a spring-biased first engaging element received in said bore and protruding into said locking hole to engage said locking portion of said stem, said locking portion having a recess for engaging and limiting said first engaging element from axial movement relative to said locking portion.

4. The fastener as claimed in claim 1, wherein said rails are formed as a pair of parallel rods, said opposite ends of said lock body receiving respectively said rods.

5. The fastener as claimed in claim 4, wherein said engagement unit further includes a passage extending in said lock body, and a spring-biased second engaging element received in said passage and protruding outward from one of said opposite ends of said lock body to engage one of said rods.

6. The fastener as claimed in claim 5, wherein said opposite ends of said lock body have notches to receive said rods, respectively, said spring-biased second engaging element protruding into one of said notches.

7. The fastener as claimed in claim 1, wherein said engagement unit includes a passage which extends from said locking hole to one of said opposite ends, a coiled spring received in said passage, a second engaging element received in said passage and biased by said coiled spring to protrude from said one of said opposite ends to engage one of said rails, said coiled spring being engageable with said locking portion of said stem.

8. The fastener as claimed in claim 7, wherein said coiled spring includes a large diameter portion substantially contacting an inner surface of said passage and a small diameter portion spaced apart from said inner surface, said small diameter portion being engageable with said locking portion and being movable radially within said passage by an external force to move away from said locking portion.

\* \* \* \* \*